(12) United States Patent
Baker et al.

(10) Patent No.: US 10,254,501 B2
(45) Date of Patent: Apr. 9, 2019

(54) JUMPER INSULATOR FOR OPTICAL CABLES USED WITH HIGH VOLTAGE CABLES

(71) Applicant: AFL GLOBAL, Swindon, Wiltshire (GB)

(72) Inventors: Jim Baker, Burford (GB); Mark Naylor, Swindon (GB)

(73) Assignee: AFL GLOBAL, Swindon, Wiltshire (GB)

( * ) Notice: Subject to any disclaimer, the term of this patent is extended or adjusted under 35 U.S.C. 154(b) by 0 days.

(21) Appl. No.: 15/115,728

(22) PCT Filed: Jan. 29, 2015

(86) PCT No.: PCT/GB2015/050204
§ 371 (c)(1),
(2) Date: Aug. 1, 2016

(87) PCT Pub. No.: WO2015/114336
PCT Pub. Date: Aug. 6, 2015

(65) Prior Publication Data
US 2017/0176703 A1    Jun. 22, 2017

(30) Foreign Application Priority Data

Jan. 31, 2014 (GB) .................................. 1401703.2

(51) Int. Cl.
*G02B 6/48* (2006.01)
*G02B 6/44* (2006.01)
(Continued)

(52) U.S. Cl.
CPC ............. *G02B 6/483* (2013.01); *G02B 6/443* (2013.01); *G02B 6/4422* (2013.01);
(Continued)

(58) Field of Classification Search
CPC ........ G02B 6/44; G02B 6/4422; G02B 6/443; G02B 6/4457; G02B 6/4465; G02B 6/48; G02B 6/483; H02G 7/04; H02G 7/05
See application file for complete search history.

(56) References Cited

U.S. PATENT DOCUMENTS

| 5,970,199 A | * | 10/1999 | Minchey | ............. G02B 6/3801 |
| | | | | 385/134 |
| 6,032,449 A | | 3/2000 | Einsle et al. | |

(Continued)

FOREIGN PATENT DOCUMENTS

| JP | 0779512 A | 3/1995 |
| JP | 07336854 A | 12/1995 |

(Continued)

OTHER PUBLICATIONS

2013-A30885 Aug. 2012 Russia FILATOV (Year: 2012).*
Examination Report in respect of the corresponding Canadian patent application dated Mar. 14, 2018.

*Primary Examiner* — Andrew Jordan
(74) *Attorney, Agent, or Firm* — Browdy and Neimark, PLLC

(57) ABSTRACT

A method of installing a fiber optic cable (10) upon an overhead power line structure, the overhead power line structure including an overhead power line support (60) and an overhead power line (90) carried by the overhead power line support (60), the method comprising the steps of passing an end of the fiber optic cable (10) through a bore formed in an insulator (120); positioning the insulator (120) at an installation location adjacent to the overhead power line support (60) with the fiber optic cable (10) located within the bore in the insulator (120); bonding the insulator (120) in place once positioned in the said installation location; connecting the insulator (120) to a first end of a conductive carrier (160); and connecting a second end of the conductive (Continued)

carrier (160) to the overhead power line (90) such that the fiber optic cable (10) is supported by the conductive carrier (160) and the insulator (120) as it passes from a first side of the overhead power line support (60) to a second side thereof.

20 Claims, 9 Drawing Sheets

(51) Int. Cl.
   *H02G 7/04* (2006.01)
   *H02G 7/05* (2006.01)
(52) U.S. Cl.
   CPC ......... *G02B 6/4457* (2013.01); *G02B 6/4465* (2013.01); *H02G 7/04* (2013.01); *H02G 7/05* (2013.01)

(56) References Cited

U.S. PATENT DOCUMENTS

| | | | |
|---|---|---|---|
| 6,070,316 A | 6/2000 | Einsle et al. | |
| 6,215,940 B1 * | 4/2001 | Johnson | G02B 6/00 174/139 |
| 10,094,998 B2 * | 10/2018 | Lin | G02B 6/4422 |
| 2017/0287665 A1 * | 10/2017 | O'Connell | H01H 71/0264 |
| 2018/0059353 A1 * | 3/2018 | Lin | H01B 9/008 |

FOREIGN PATENT DOCUMENTS

| | | | | |
|---|---|---|---|---|
| JP | 0837712 A | | 2/1996 | |
| KR | 20130056102 A | * | 5/2013 | |
| KR | 101394095 B1 | * | 5/2014 | ............ H02G 7/205 |
| WO | 9800742 A1 | | 1/1998 | |

* cited by examiner

JUMPER INSULATOR FOR OPTICAL CABLES USED WITH HIGH VOLTAGE CABLES

FIELD OF THE INVENTION

The present disclosure relates to an overhead power line structure and to a method and apparatus for installing a fibre optic cable on an overhead power line.

BACKGROUND OF THE INVENTION

Fibre optic cables can be installed along overhead power lines, typically to provide telecommunication links or the means to control or monitor remote sub stations. Installation can take place on the earthwire (i.e. the conductor at the top of a tower system which does not normally carry current) or the phasewire (i.e. one of the current carrying conductors). Installation on the phasewire is the only option where no earthwire exists e.g. on low voltage wood pole lines. These lines typically have three conductors arranged side-by-side. Other arrangements are used and also the support structures are not limited to wood poles e.g. they may be concrete poles or metal lattice structures.

Most poles have spacing insulators which simply hold up the conductors. A schematic view of a spacing insulator is shown in FIG. 1. In that Figure, a fibre optic cable 10 is guided around a spacing insulator 20 upon a pole 30 using a simple channel arrangement 40. The fibre optic cable 10 sits in the channel arrangement 40 and is guided from one side of the pole 30 to the other. The channel arrangement 40 is preferably formed from metal since this ensures that the fibre optic cable 10 is everywhere maintained at the potential of the conductor 50. This in turn prevents leakage currents from flowing along the fibre optic cable 10.

A second form of pole is known as a section pole and is shown in FIG. 2. In that figure, components common to FIGS. 1 and 2 are labelled with like reference numerals.

In the section pole 60 shown in FIG. 2, conductors 50 are anchored to cross members 65 mounted upon the section pole 60. The section pole 60 is braced to support the tension of the conductors 50 (for example by the use of guy wires not shown). Section poles are used in straight sections to limit the 'domino effect' should a conductor break. At a section pole, the current passes from one side of the pole 60 to the other via conductive jumpers 70a, 70b, 70c which are usually short sections of the same conductor 50. In this known arrangement the fibre optic cable 10 is secured to the conductive jumper and thereby passes from one side of the pole 60 to the other. Where the line changes direction a similar arrangement is used to deal with the sideways force exerted by the conductors on the pole. This pole is known as an angle pole. The present invention applies equally to both types of pole but for brevity henceforth only section poles will be described.

If maintenance is carried out to the overhead line, then a section of line up to angle or section pole may be de-energised, whilst the adjacent section remains energised. The conductive jumper is detached from one side of the pole so there is a complete mechanical break (and therefore a complete electrical isolation) between the energised and de-energised conductors. The fibre optic cable is unsecured from the conductive jumper so the conductive jumper can be detached.

For the fibre optic cable, two problems arise:
1. it is unsupported and therefore subject to mechanical damage e.g. if conditions should be windy
2. it is subject to the full phase-to-ground potential.

The present invention seeks to address these and other problems with the art.

SUMMARY OF THE INVENTION

According to a first aspect of the present invention, there is provided a method of installing a fibre optic cable upon an overhead power line structure, the overhead power line structure including an overhead power line support and an overhead power line carried by the overhead power line support, the method comprising the steps of: passing an end of the fibre optic cable through a bore formed in an insulator; positioning the insulator at an installation location adjacent to the overhead power line support with the fibre optic cable located within the bore in the insulator; bonding the insulator in place once positioned in the said installation location; connecting the insulator to a first end of a conductive carrier; and connecting a second end of the conductive carrier to the overhead power line; such that the fibre optic cable is supported by the conductive carrier and the insulator as it passes from a first side of the overhead power line support to a second side thereof.

The method steps may be carried out in any order.

Preferably, prior to positioning the insulator adjacent to the overhead power line, the insulator is freely moveable relative to the fibre optic cable, and bonding the insulator in place comprises:

injecting a filler into the annulus formed by the bore of the insulator and the fibre optic cable once the insulator has been positioned adjacent to the overhead power line support.

The method may further comprise moving the fibre optic cable along the path of the overhead power line or along the overhead power line itself towards the overhead power line support, and supporting the fibre optic cable by the overhead power line at a plurality of locations away from the overhead power line support. By path of the overhead power line is meant the course taken by the overhead power line. For example, the method may optionally comprise moving the fibre optic cable along the path of the overhead power line at ground level below the overhead power line.

In this case the moving step may comprise wrapping the fibre optic cable around the overhead power line as the fibre optic cable and the insulator are drawn towards the overhead power line support.

The overhead power line structure may comprise a plurality of spaced overhead power line supports, the method further comprising passing the end of the fibre optic cable through a further one or more insulators, and positioning the or each further one or more insulator(s) adjacent to respective separate overhead power line supports.

There is also provided, in accordance with a second aspect of the present invention, an overhead power line structure comprising: an overhead power line support; an overhead power line carried by the overhead power line support; a conductive jumper removably connected between the overhead power line on a first side of the overhead power line support and the overhead power line on a second side of the overhead power line support; and a member connecting the overhead power line on the first and the second sides of the overhead power line; the member comprising at least one insulator with a bore though which a fibre optic cable passes and at least one carrier adapted to carry a fibre optic cable linking one end of the insulator to one side of the overhead power line, wherein the member provides electrical protection and mechanical support to the fibre optic cable.

Preferably the member comprises an insulator, a first carrier linking a first end of the insulator to the first side of the overhead power line, and a second carrier linking a second end of the insulator to the second side of the overhead power line.

The carrier may be formed of or contain a conducting material.

Preferably, the carrier includes a channel which accepts and guides the fibre optic cable.

It is desirable that the length of the insulator within the member is relatively short. Preferably, the length of the insulator is no more than about 0.75 m, more preferably no more than about 0.5 m.

The annulus formed by the bore in the insulator and the fibre optic cable may be filled with a filler. Optionally, the filler is a dielectric gel.

The overhead power line support may be a pole from which the overhead power line is spaced using one or more spacing insulators.

Optionally, the pole is a section pole, the overhead power line being connected to a first side of the section pole via a first spacing insulator and connected to a second side of the section pole via a second spacing insulator.

According to still another aspect of the present invention, there is provided an apparatus for installing a fibre optic cable onto an overhead power line comprising: a body which sits upon the overhead power line and is moveable along the overhead power line; a supply of fibre optic cable; a carriage, also mounted in fixed relation to the body, the carriage being configured to support an insulator; and a cable guiding means configured to direct fibre optic cable from the supply of fibre optic cable, to the overhead power line, via the carriage.

Preferably, the supply of fibre optic cable is mounted in fixed relation to the body.

In this case the supply of fibre optic cable may comprise a drum upon which the fibre optic cable is carried, the drum being mounted upon the body of the fibre optic cable installation apparatus; and the carriage mounted upon the body of the fibre optic cable installation apparatus in a position that is opposed to the drum, so as to provide a counterbalance thereto.

Optionally, the body is mountable upon the overhead power line in a direction parallel with the axis of elongation of the power line, and the drum and the carriage each extend away from the body in opposing directions perpendicular to the axis of elongation of the power line.

In a further embodiment the supply of fibre optic cable comprises a drum upon which the fibre optic cable is carried, the drum being mounted upon the body of the fibre optic cable installation apparatus; and a counterbalance for the drum is mounted upon the body of the fibre optic cable installation apparatus in a position that is opposed to the drum.

In this case the body and the carriage may be mountable upon the overhead power line in a direction parallel with the axis of elongation of the power line, and the drum and the counterbalance may each extend away from the body in opposing directions perpendicular to the axis of elongation of the power line.

Preferably, the cable guiding means comprises a series of pulleys mutually spaced so as to guide the fibre optic cable from the supply of fibre optic cable, through the carriage and to the overhead power line.

The apparatus may further comprise motive means for driving the body of the fibre optic cable installation apparatus along the overhead power line so as to cause the fibre optic cable to be wrapped around the overhead power line.

The present invention also provides, in combination, the apparatus as described above, with an insulator, the insulator having a bore and being mounted upon or within the carriage of the apparatus, wherein the fibre optic cable passes through the bore in the insulator, between the supply of fibre optic cable and the overhead power line.

Still a further aspect of this invention provides a member for an overhead power line, the member comprising a generally elongate insulator having a bore extending longitudinally along the insulator and adapted to receive and support a fibre optic cable; and first and second carriers formed of or containing a conducting material, the first carrier having a first end connected to a first end of the insulator, and a second end having a first clamp member for clamping the first carrier to an overhead power line on a first side of an overhead power line support; the second carrier having a first end connected to a second end of the insulator opposed to the first end thereof in the longitudinal direction, and a second end having a second clamp member for clamping the second carrier to the overhead power line on a second side of the overhead power line support.

BRIEF DESCRIPTION OF THE DRAWINGS

Embodiments of the present disclosure will now be described, by way of example only, with reference to the accompanying drawings in which.

DETAILED DESCRIPTION

Figure 1:
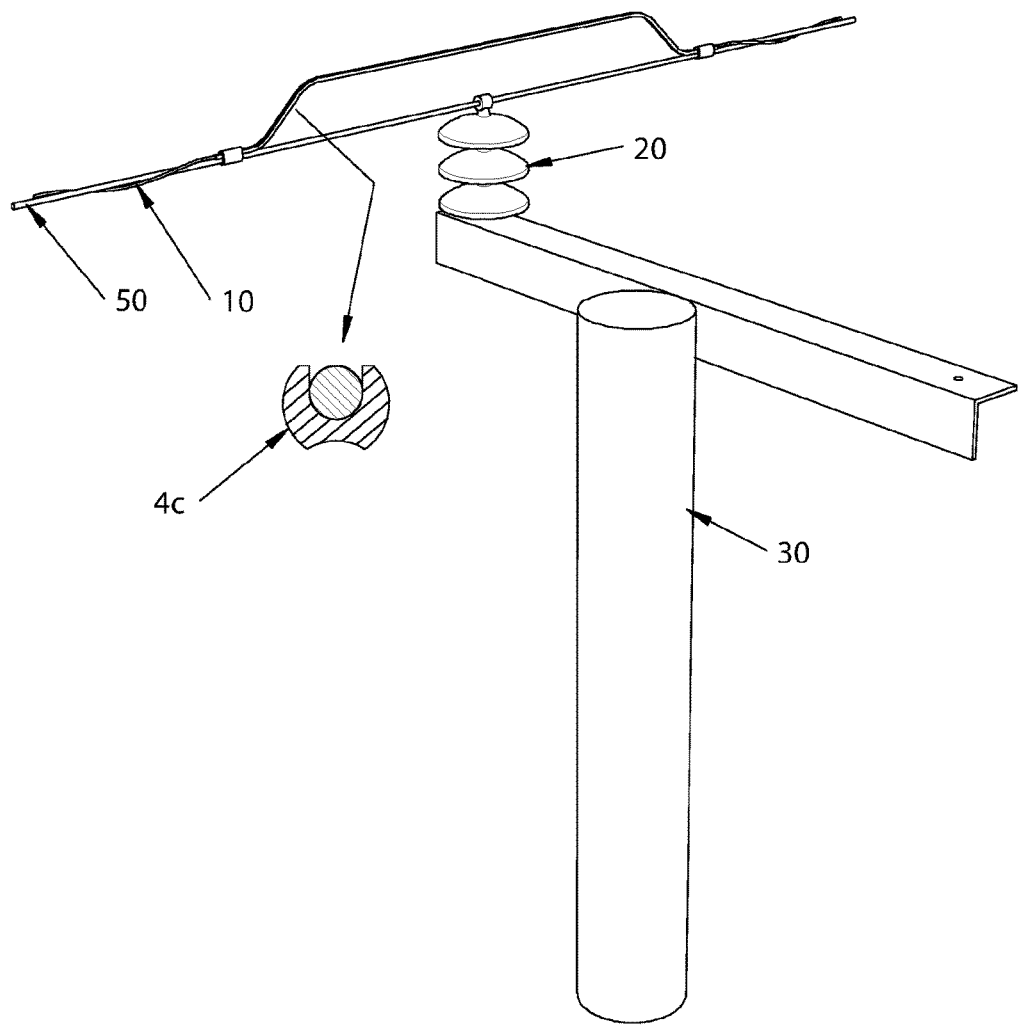
FIG. 1 shows a schematic perspective view of the upper part of an overhead power line pole with a prior art spacing insulator.
Figure 2:
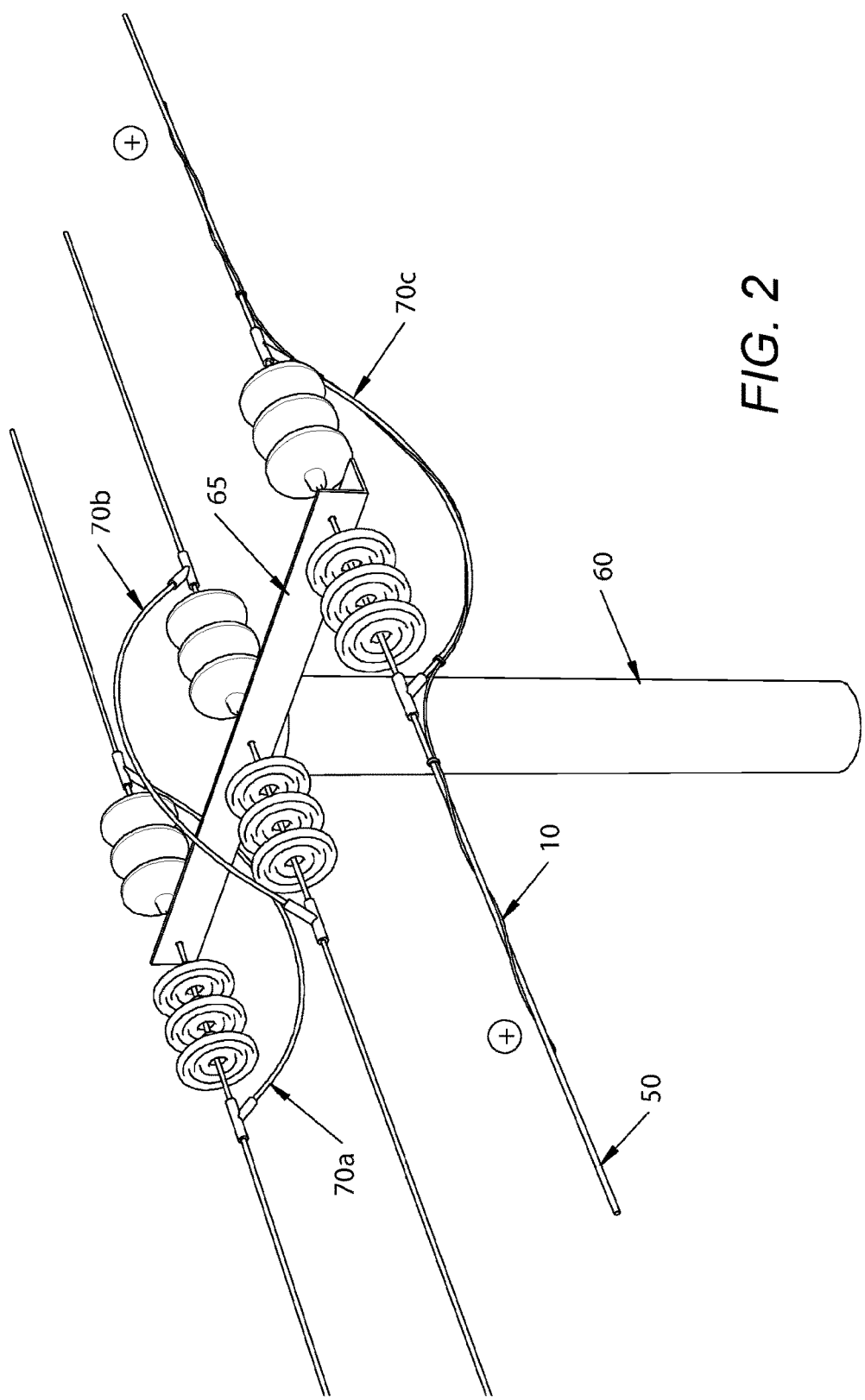
FIG. 2 shows a schematic perspective view of the upper part of an overhead power line section pole with a prior art conductive jumper.
Figure 3:
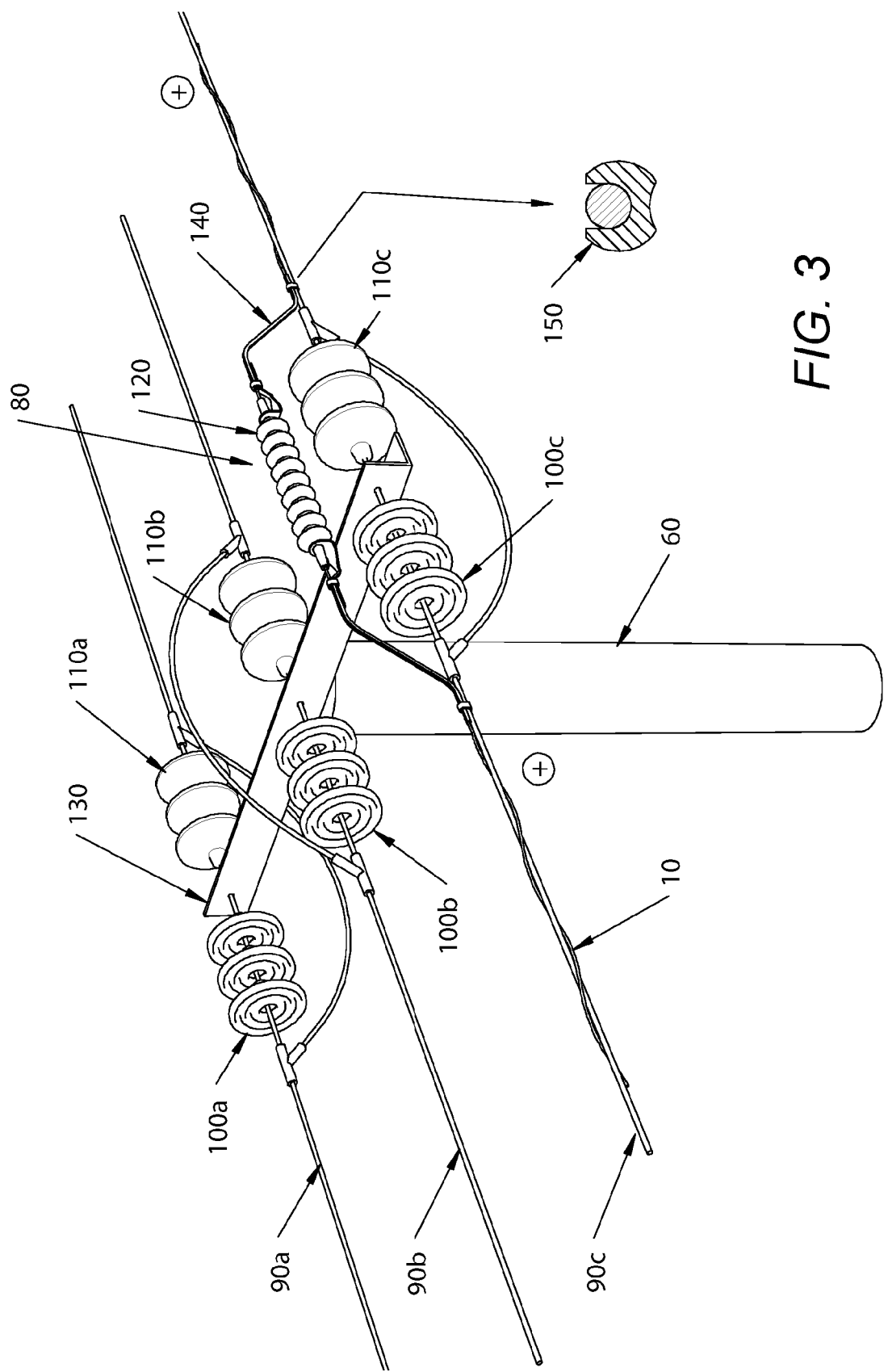
FIG. 3 shows a schematic perspective view of the upper part of a section pole embodying the present invention, with a member adapted to carry a fibre optic cable.

FIG. 3 illustrates a member 80 in accordance with an embodiment of the present invention, installed at a section pole 60. Overhead power lines 90*a*, 90*b*, 90*c* are connected to a first side of the section pole 60 via first spacing insulators 100*a*, 100*b*, 100*c* and connected to a second side of the section pole via second spacing insulators 110*a*, 110*b*, 110*c*. The member 80 comprises an insulator 120, a first carrier 130 linking a first end of the insulator 120 to a first side of the overhead power line 90*a*-90*c* and a second carrier 140 linking a second end of the insulator 120 to a second side of the overhead power line 90a-90c. Fibre optic cable 10 passes from one side of the section pole 60 to the other via a channel 150 formed within the first carrier 130 and second carrier 140 and a bore in the insulator 120.

During maintenance to the overhead power line 90 the insulator 120 may be subject to the full phase-to-ground voltage. Preferably, the insulator 120 is rated for the line voltage since the maintenance period can be of indeterminate duration. Insulators 120 may incorporate sheds (resembling mushrooms) to maintain relatively dry areas (like an umbrella) and to increase the surface paths from phase-to-ground. The surface length of an insulator from phase-to-ground is known as the creepage and is usually measured in mm. The sheds therefore increase the surface resistance when the insulator 120 is wet, thereby reducing potentially damaging leakage currents to a safe level. The minimum creepage needed depends on the given line voltage; therefore the overall length of an insulator is related to the line voltage as well. For example, an insulator 120 rated at 33 kV is preferably less than 0.75 m long, more preferably about 0.5 m long. An insulator 120 rated at 24 kV is preferably less than 0.5 m long, more preferably about 0.3 m long.

Preferably the member 80, the insulator 120 and the apparatus for installation are handleable by linesmen working at the top of a pole. Therefore, preferably, the length of the insulator 120 should be no longer than the minimum which is needed to rate it at the line voltage.

With regard to the length of the member 80 the fibre optic cable 10 must be supported from the first side of the overhead power line to the second side of the overhead power line and protected electrically. This is typically a distance of several meters. An insulator of several meters is typically much longer than it needs to be (to function electrically) and would also not be handleable. For an insulator having the minimum length one or more carriers 130, 140 are needed to provide additional support and to protect the fibre optic cable 10 electrically. The path of the member 80 should also maintain a safety clearance to ground potential.

Figure 4:
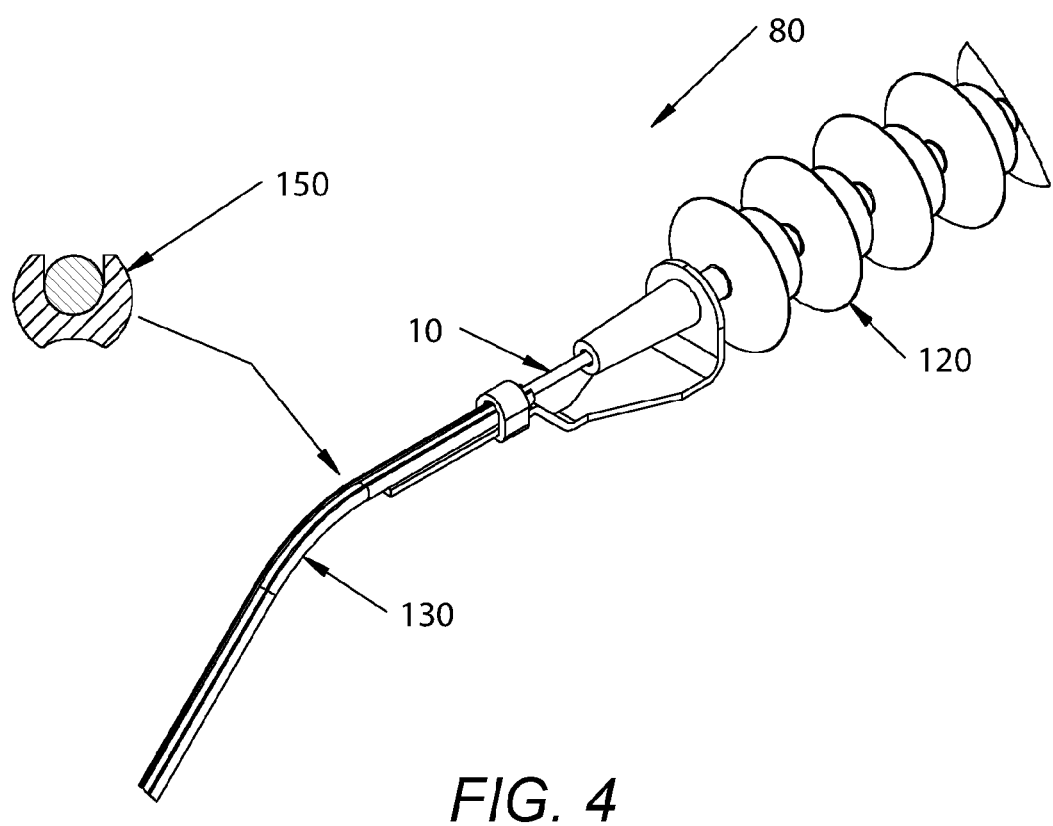
FIG. 4 shows a magnified perspective view of part of the member of FIG. 3.

FIG. 4 shows a magnified view of part of the member 80 illustrating the channel 150 in the first carrier 130.

Figure 5:
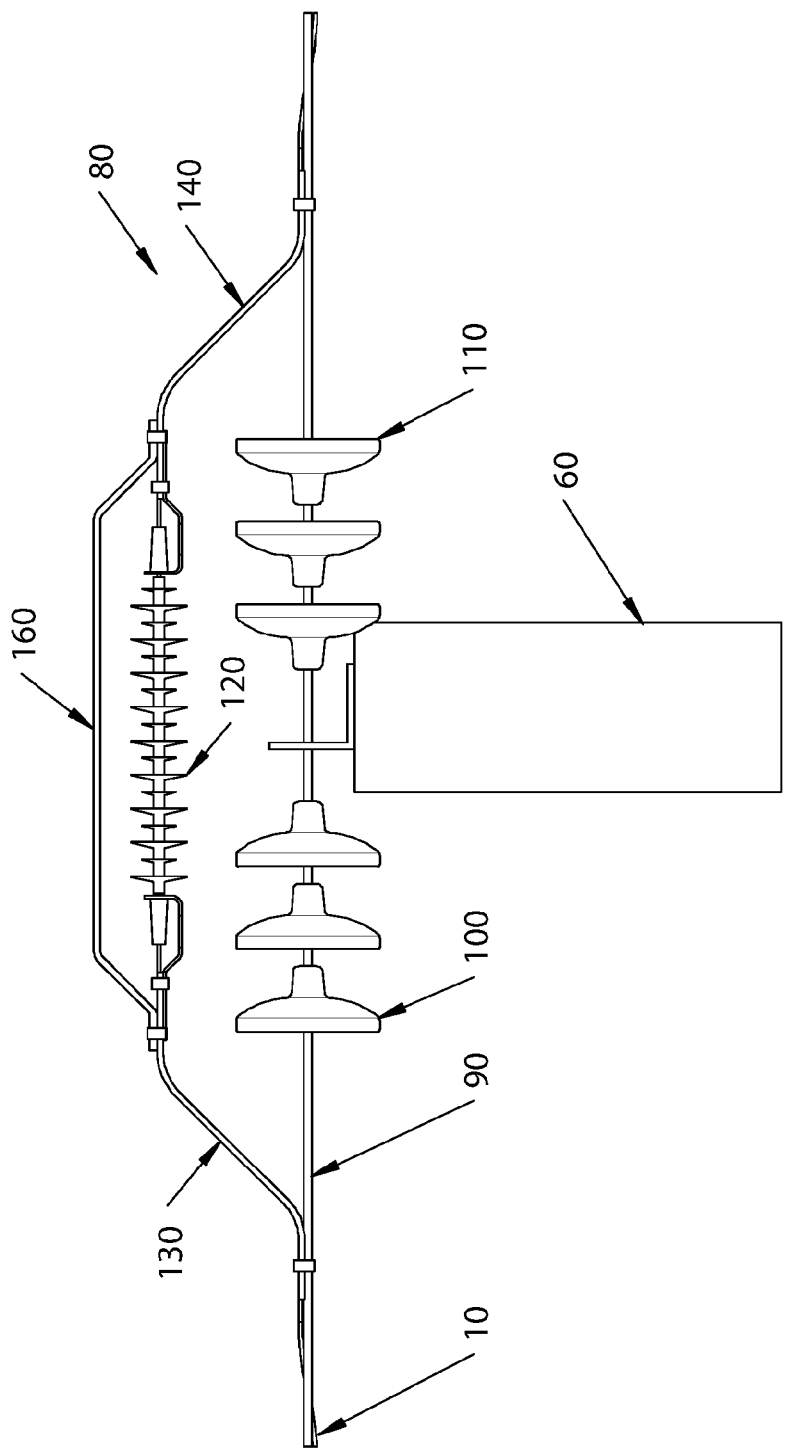
FIG. 5 shows, schematically, a side view of the upper part of a section pole with a conductive jumper and a member.

FIG. 5 illustrates an overhead power line structure of the present disclosure. Overhead power line 90 is connected to the first side of the section pole 60 via first spacing insulator 100 and connected to the second side of the section pole 60 via second spacing insulator 110. Member 80 comprises insulator 120, first carrier 130 and second carrier 140. A connector 160 links first carrier 130 and second carrier 140 forming a conductive jumper. The fibre optic cable 10 passes from one side of the section pole 60 to the other via a channel 150 formed within the first carrier 130 and second carrier 140 and a bore in the insulator 120.

Figure 6:
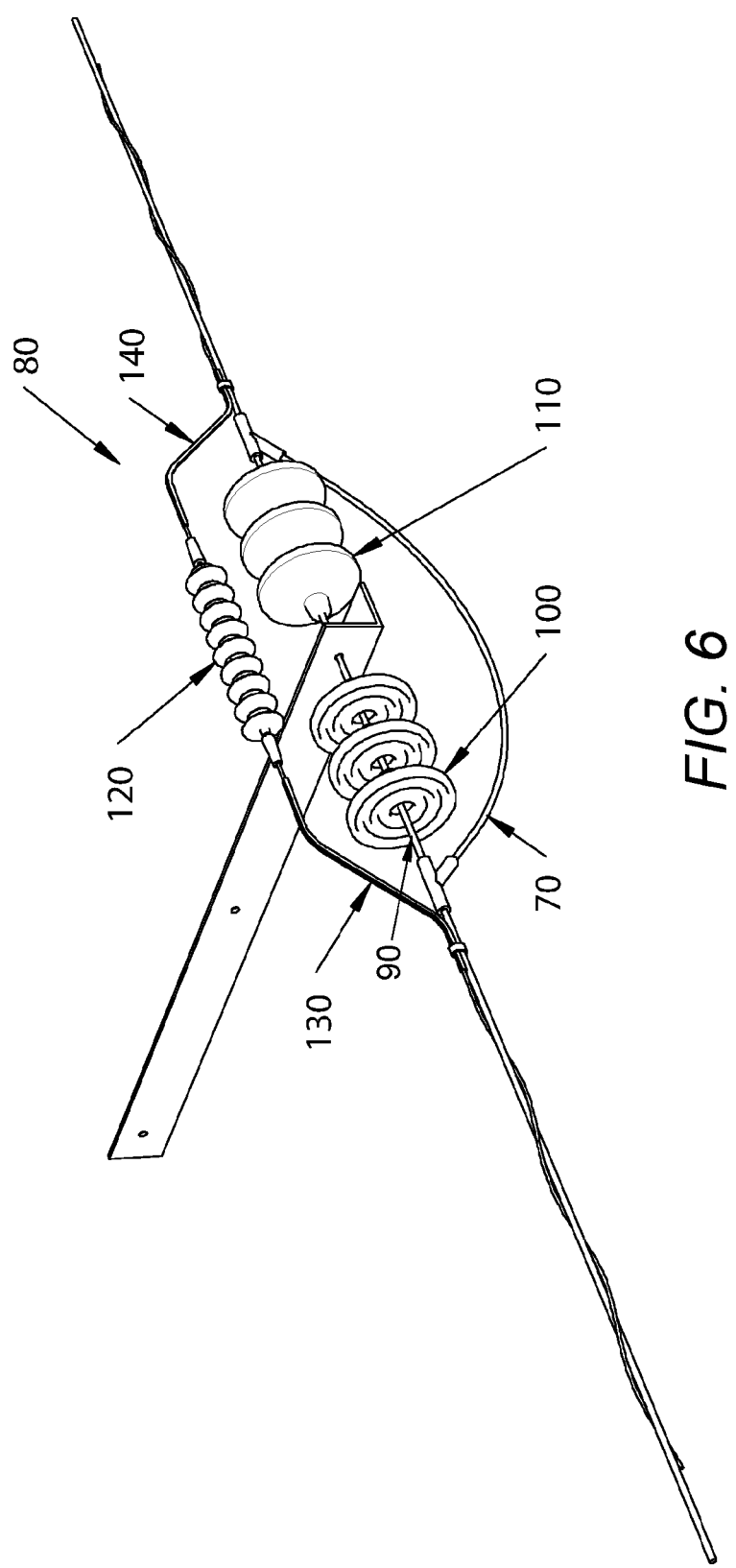
FIG. 6 shows, schematically, another arrangement of a conductive jumper and a member at a section pole, also embodying the invention.

In FIG. 6 another overhead power line structure of the present disclosure is illustrated. Overhead power line 90 is connected to the first side of the section pole 60 via first spacing insulator 100 and connected to the second side of the section pole 60 via second spacing insulator 110. Member 80 comprises insulator 120, first carrier 130 and second carrier 140. The fibre optic cable 10 passes from one side of the section pole 60 to the other via a channel 150 formed within first carrier 130 and second carrier 140 and a bore in the insulator 120. Conductive jumper 70 is removably connected between the overhead power line 90 on the first side of the section pole 60 and the overhead power line 90 on the second side of the section pole 60. When maintenance is carried out to the overhead power line 90 the conductive jumper 70 is detached from one side so there is a complete mechanical break between the energised and de-energised conductors. The de-energised section is earthed. In these circumstances the member 80, in addition to providing mechanical support for the fibre optic cable 10, limits the potentially damaging surface leakage currents.

Figure 7:
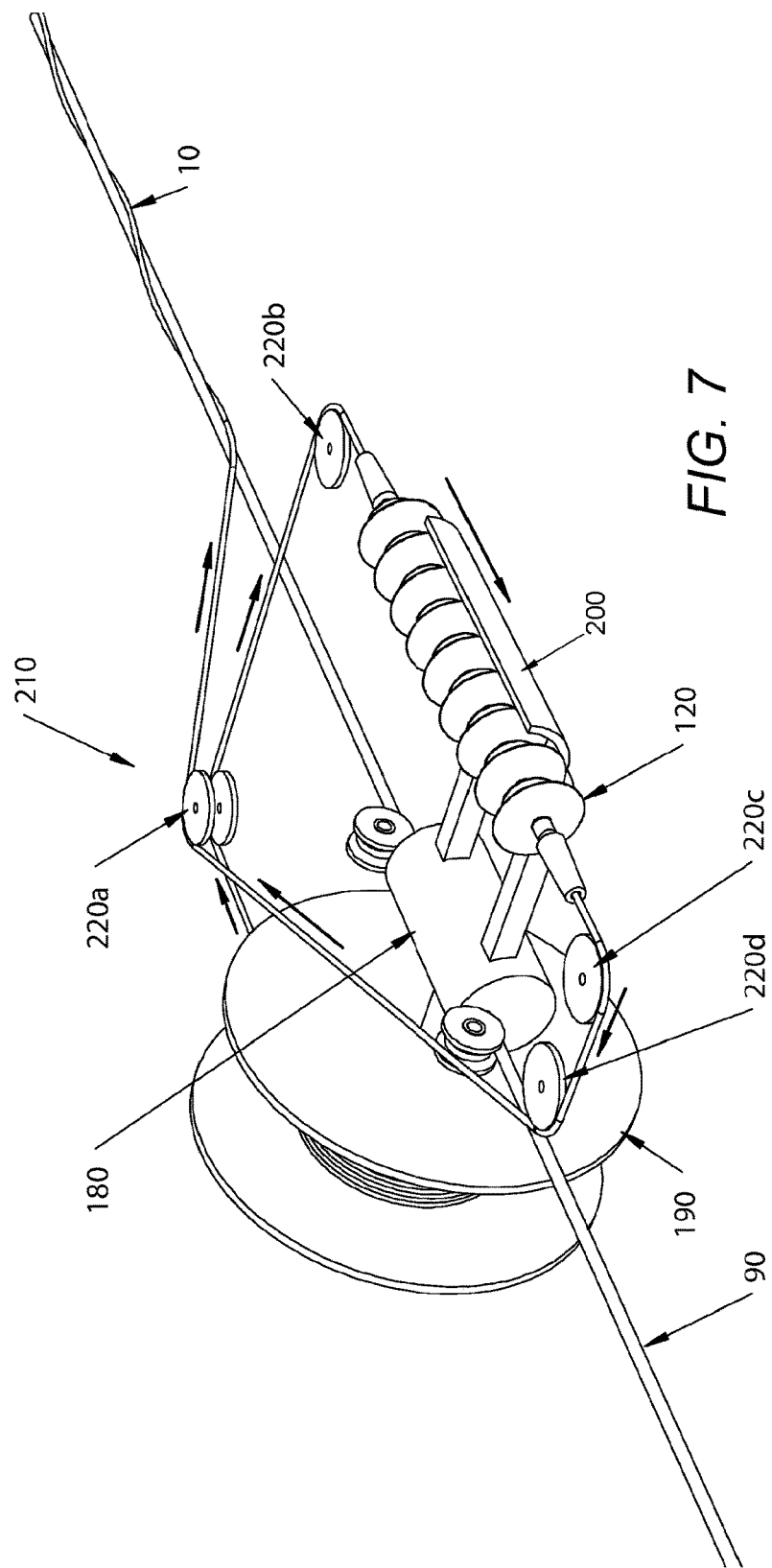
FIG. 7 shows a schematic perspective view of an apparatus for installing a fibre optic cable onto an overhead power line of the present disclosure.

FIG. 7 shows an apparatus for installing fibre optic cable 10 onto an overhead power line 90 of the present disclosure. The apparatus comprises a body 180 which sits upon the overhead power line 90, a drum 190 upon which the fibre optic cable 10 is carried, a carriage 200 configured to support an insulating member 80 and cable guiding means 210 configured to direct fibre optic cable 10 from the drum 190 to the overhead power line 90 via the carriage 200. The drum 190 and carriage 200 are mounted upon the body 180 such that the carriage 200 is in a position that is opposed to the drum 190 so as to provide a counterbalance thereto. The insulator 120 is mounted upon or within the carriage 200. The cable guiding means 210 comprises a series of pulleys 220a, 220b, 220c, 220d mutually spaced so as to guide the fibre optic cable 10 from the drum 190 through the bore in the insulator 120 supported by the carriage 200 and to the overhead power line 90.

Figure 8:
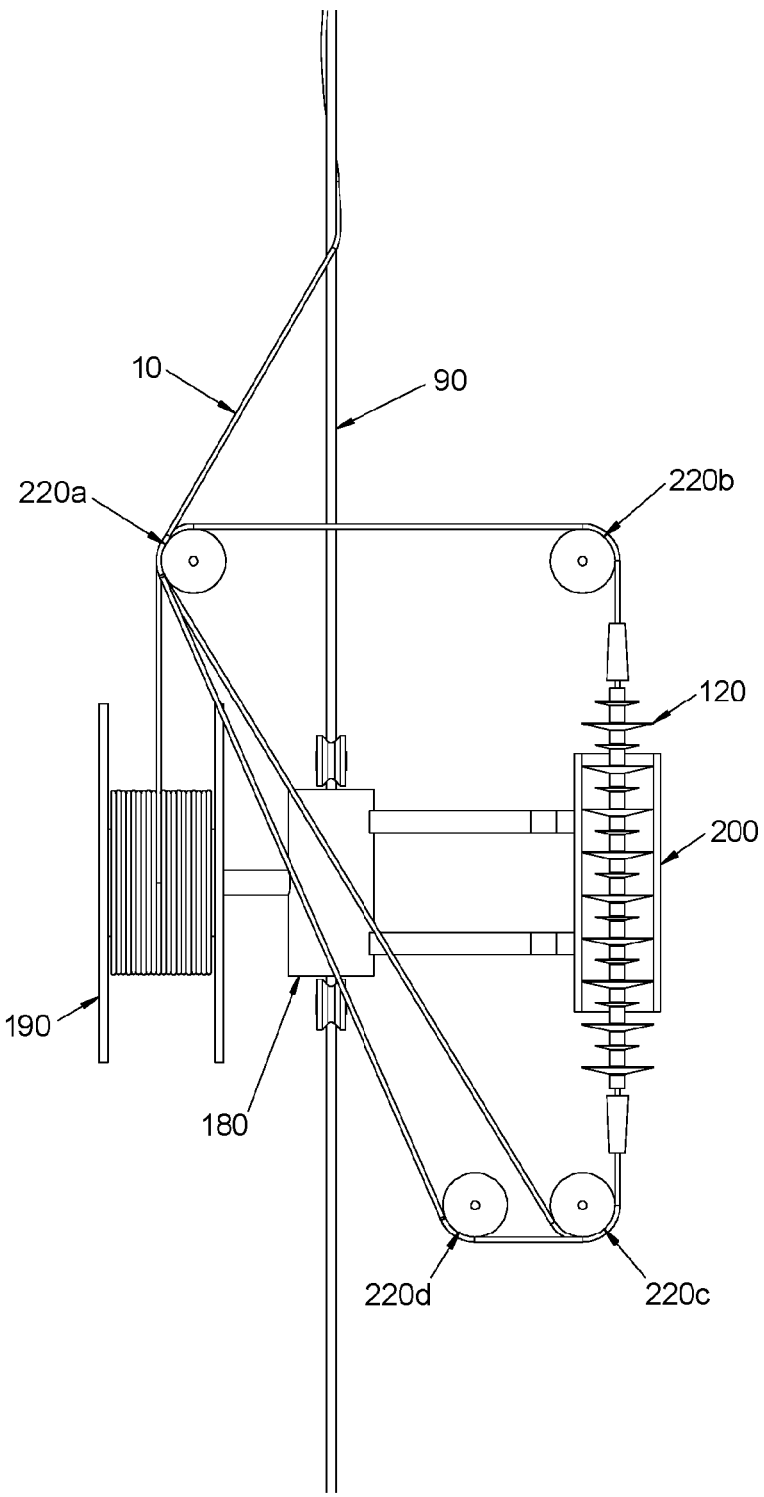
FIG. 8 shows, schematically, a top view of the apparatus of FIG. 7.

FIG. 8 shows a top view of the apparatus of FIG. 7 further illustrating the pulleys 220a, 220b, 220c, 220d that guide the fibre optic cable 10 from the drum 190 through the bore in the insulator 120 supported by the carriage 200 and to the overhead power line 90.

In use, the body 180 rotates around the overhead power line 90 as it moves along the overhead power line 90 thereby wrapping the fibre optic cable 10 around the overhead power line 90. Once a section pole 60 is reached where the insulator 120 is to be fitted, the insulator 120 is removed from the carriage 200 and installed to produce an arrangement as shown in FIG. 5 or 6. A filler is injected into the annulus formed by the bore of the insulator 120 and the fibre optic cable 10 once the insulator 120 has been positioned. One example of a suitable filler is Sylgard® 527 (Dow Corning). This mode of installation produces an arrangement where the fibre optic cable is supported by an insulator with a bore that has no split lines through which there can be moisture ingress.

Figure 9:
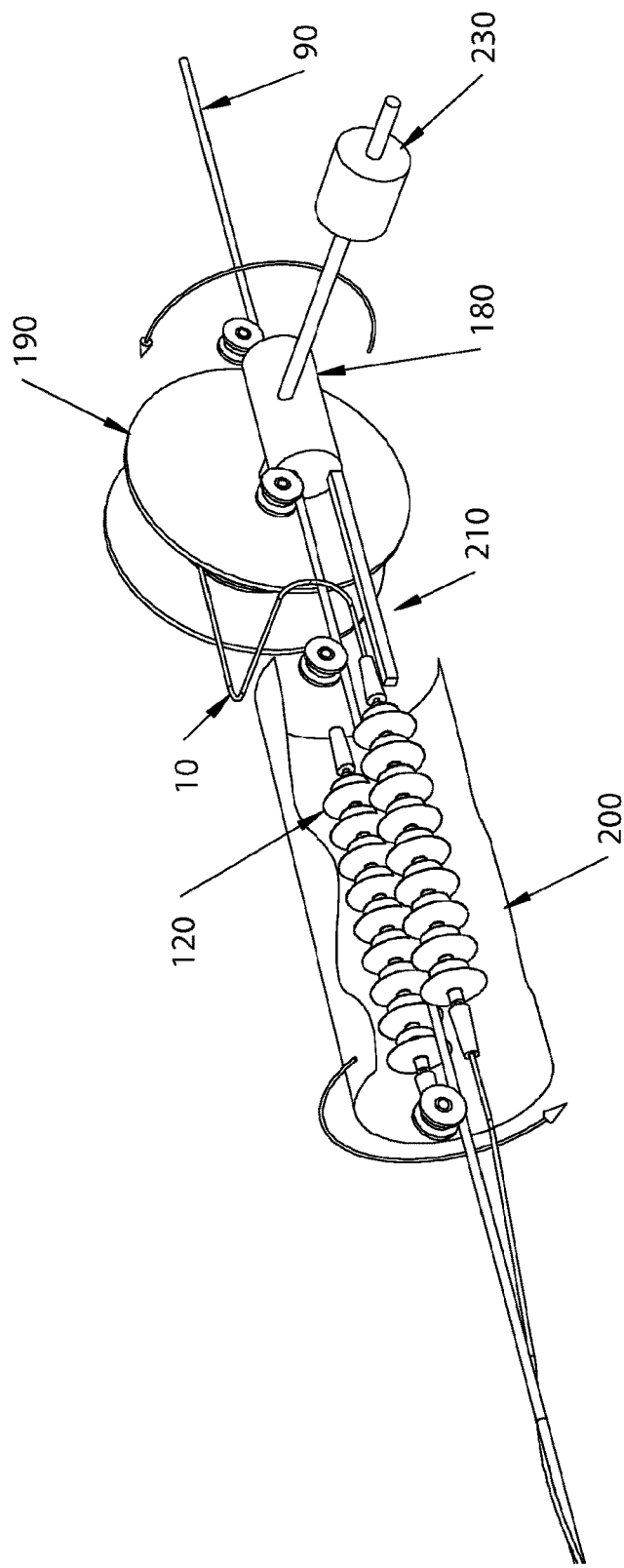
FIG. 9 shows a schematic perspective view of another apparatus for installing a fibre optic cable onto an overhead power line, in accordance with an embodiment of the invention.

The apparatus illustrated in FIG. 9 is another apparatus for installing a fibre optic cable 10 onto an overhead power line 90 of the present disclosure. The apparatus comprises a body 180 which sits upon the overhead power line 90, a drum 190 upon which the fibre optic cable 10 is carried, a counterbalance 230, a carriage 200 configured to support an insulator 120 and cable guiding means 210 configured to direct fibre optic cable 10 from the drum 190 to the overhead power line 90 via the carriage 200. The body 180 and the carriage 200 are mounted upon the overhead power line 90 in a direction parallel with the axis of elongation of the power line while the drum 190 and the counterbalance 230 each extend away from the body 180 in opposing directions perpendicular to the axis of elongation of the power line. The insulator 120 has a bore and is mounted upon or within the carriage 200. The cable guiding means 210 guide the fibre optic cable 10 from the drum 190 through the bore in the insulator 120 supported by the carriage 200 and to the overhead power line 90. Also mounted upon or within the carriage 200 is a further insulator 120 or another appropriate counterbalance for the insulator 120.

Features of embodiments described above may be combined in any suitable combination with features of other embodiments described above as will be readily apparent to the skilled reader and the specific combinations of features described should not be understood to be limiting.

The invention claimed is:

1. A method of installing a non-conductive fibre optic cable upon an overhead power line structure, the overhead power line structure including an overhead power line support and an overhead power line carried by the overhead power line support, the method comprising the steps of:
   passing an end of the non-conductive fibre optic cable through a bore formed in an insulator;
   positioning the insulator at an installation location adjacent to the overhead power line support with the non-conductive fibre optic cable located within the bore in the insulator;
   bonding the insulator in place once positioned in the said installation location;
   conductively connecting one end of the insulator to a first end of a first conductive carrier; and conductively connecting a second end of the first conductive carrier to the overhead power line; and
   conductively connecting a second end of the insulator to a first end of a second conductive carrier and conductively connecting a second end of the second conductive carrier to the overhead power line,
   such that the insulator is mechanically supported by the first and second conductive carriers and the non-conductive fibre optic cable is supported by the first and second conductive carriers and the insulator as the non-conductive fibre optic cable passes from a first side of the overhead power line support to a second side thereof,
   wherein the insulator and first and second conductive carriers provide electrical protection and mechanical support to the non-conductive fibre optic cable.

2. The method of claim 1, wherein, prior to positioning the insulator adjacent to the overhead power line, the insulator is freely moveable relative to the non-conductive fibre optic cable, and wherein bonding the insulator in place comprises:
   injecting a filler into the annulus formed by the bore of the insulator and the non-conductive fibre optic cable once the insulator has been positioned adjacent to the overhead power line support.

3. The method of claim 1, further comprising moving the non-conductive fibre optic cable along the path of the overhead power line or along the overhead power line itself towards the overhead power line support, and supporting the non-conductive fibre optic cable by the overhead power line at a plurality of locations away from the overhead power line support.

4. The method of claim 3, wherein the moving step comprises wrapping the non-conductive fibre optic cable around the overhead power line as the non-conductive fibre optic cable and the insulator are drawn towards the overhead power line support.

5. The method of claim 1, wherein the overhead power line structure comprises a plurality of spaced overhead power line supports, the method further comprising passing the end of the non-conductive fibre optic cable through a further one or more insulators, and positioning the or each further one or more insulator(s) adjacent to respective separate overhead power line supports.

6. An apparatus for installing a non-conductive fibre optic cable onto an overhead power line structure according to the method of claim 1, comprising:
   a body which sits upon the overhead power line and is moveable along the overhead power line;
   a supply of non-conductive fibre optic cable;
   a carriage, also mounted in fixed relation to the body, the carriage being configured to support an insulator; and
   a cable guiding means configured to direct non-conductive fibre optic cable from the supply of non-conductive fibre optic cable, to the overhead power line, via the carriage.

7. The apparatus of claim 6, wherein the supply of non-conductive fibre optic cable is mounted in fixed relation to the body.

8. The apparatus of claim 7, wherein the supply of non-conductive fibre optic cable comprises a drum upon which the non-conductive fibre optic cable is carried, the drum being mounted upon the body of the non-conductive fibre optic cable installation apparatus; and further wherein the carriage is mounted upon the body of the non-conductive fibre optic cable installation apparatus in a position that is opposed to the drum, so as to provide a counterbalance thereto.

9. The apparatus of claim 8, wherein the body is mountable upon the overhead power line in a direction parallel with the axis of elongation of the power line, and wherein the drum and the carriage each extend away from the body in opposing directions perpendicular to the axis of elongation of the power line.

10. The apparatus of claim 7, wherein the supply of non-conductive fibre optic cable comprises a drum upon which the non-conductive fibre optic cable is carried, the drum being mounted upon the body of the non-conductive fibre optic cable installation apparatus; and wherein a counterbalance for the drum is mounted upon the body of the non-conductive fibre optic cable installation apparatus in a position that is opposed to the drum.

11. The apparatus of claim 10, wherein the body and the carriage are mountable upon the overhead power line in a direction parallel with the axis of elongation of the power line, and wherein the drum and the counterbalance each extend away from the body in opposing directions perpendicular to the axis of elongation of the power line.

12. The apparatus of claim 6, wherein the cable guiding means comprises a series of pulleys mutually spaced so as to guide the non-conductive fibre optic cable from the supply of non-conductive fibre optic cable, through the carriage and to the overhead power line.

13. The apparatus of claim 6 further comprising motive means for driving the body of the non-conductive fibre optic cable installation apparatus along the overhead power line so as to cause the non-conductive fibre optic cable to be wrapped around the overhead power line.

14. In combination, the apparatus of claim 6, with an insulator, the insulator having a bore and being mounted upon or within the carriage of the apparatus, wherein the non-conductive fibre optic cable passes through the bore in the insulator, between the supply of non-conductive fibre optic cable and the overhead power line.

15. An overhead power line structure comprising:
   an overhead power line support;
   an overhead power line carried by the overhead power line support;
   a conductive jumper removably connected between the overhead power line on a first side of the overhead power line support and the overhead power line on a second side of the overhead power line support; and
   a member connecting the overhead power line on the first and the second sides of the overhead power line;
   the member comprising an insulator with a bore though which a non-conductive fibre optic cable passes and a first carrier and a second carrier, each configured to mechanically support the insulator and the non-conductive fibre optic cable, the first carrier conductively connected to a first end of the insulator conductively connected to the first side of the overhead power line, and the second carrier conductively connected to a second end of the insulator and conductively connected to the second side of the overhead power line, wherein the member provides electrical protection and mechanical support to the non-conductive fibre optic cable; and each carrier is formed of or contains a conductive material.

16. The structure of claim 15, wherein the carrier includes a channel which accepts and guides the non-conductive fibre optic cable.

17. The structure of claim 15, wherein the annulus formed by the bore in the insulator and the non-conductive fibre optic cable is filled with a filler.

18. The structure of claim 15, wherein the overhead power line support is a pole from which the overhead power line is spaced using one or more spacing insulators.

19. The structure of claim 18, wherein, the pole is a section pole, the overhead power line being connected to a first side of the section pole via a first spacing insulator and connected to a second side of the section pole via a second spacing insulator.

20. A member for providing electrical protection and mechanical support to a non-conductive fibre optic cable on an overhead power line, the member comprising a generally elongate insulator having a bore extending longitudinally along the insulator and adapted to receive and support a non-conductive fibre optic cable; and first and second carriers formed of or containing a conducting material, the first carrier having a first end conductively connected to a first end of the insulator, and a second end having a first clamp member configured to conductively clamp the first carrier to an overhead power line on a first side of an overhead power line support; the second carrier having a first end conductively connected to a second end of the insulator opposed to the first end thereof in the longitudinal direction, and a second end having a second clamp member configured to conductively clamp the second carrier to the overhead power line on a second side of the overhead power line support, the first carrier and the second carrier configured to mechanically support the insulator and the non-conductive fibre optic cable as the non-conductive fibre optic cable passes from a first side of the overhead power line support to a second side thereof.

\* \* \* \* \*